United States Patent [19]

Targos

[11] Patent Number: 4,714,693

[45] Date of Patent: Dec. 22, 1987

[54] METHOD OF MAKING A CATALYST COMPOSITION COMPRISING UNIFORM SIZE METAL COMPONENTS ON CARRIER

[75] Inventor: William M. Targos, Palatine, Ill.

[73] Assignee: UOP Inc., Des Plaines, Ill.

[21] Appl. No.: 847,982

[22] Filed: Apr. 3, 1986

[51] Int. Cl.$^4$ .................. B01J 21/04; B01J 21/08; B01J 21/12; B01J 23/40

[52] U.S. Cl. .................. 502/261; 502/258; 502/325; 502/332; 502/333; 502/334; 502/339

[58] Field of Search ............ 502/325, 339, 261, 258, 502/332, 333, 334; 106/1.05, 1.11, 1.21; 252/313.1

[56] References Cited

U.S. PATENT DOCUMENTS

| | | | |
|---|---|---|---|
| 3,992,331 | 11/1976 | Petrow et al. | 502/339 |
| 4,425,261 | 1/1984 | Stenius et al. | 502/339 |
| 4,593,016 | 6/1986 | Amelio et al. | 502/339 |

OTHER PUBLICATIONS

Boudart, "Structure Sensitivity of Hydrocarbon Syntheses from CO and $H_2$", vol. 88, No. 11, pp. 2185–2195 (1984).

*Primary Examiner*—W. J. Shine
*Attorney, Agent, or Firm*—Thomas K. McBride; John F. Spears, Jr.

[57] ABSTRACT

A reverse micelle impregnant solution comprising a hydrocarbon solvent, a surfactant having both polar and nonpolar characteristics and a metal ion containing water core wherein the concentration of said metal ion in said water core is greater than 0.1 moles/liter. The reverse micelle is prepared by first dissolving a metal compound in water. In order to maintain a minimum water core diameter a small amount of the aqueous solution is then added to a surfactant/hydrocarbon solution to form the reverse micelle impregnant solution. Metals contemplated include the platinum metals and Group VIII metals. The surfactant may be nonionic, anionic or cationic or any combination thereof. A reverse micelle solution containing co-surfactants and/or co-metals is also contemplated. In addition, a method for depositing metals contained in the reverse micelle impregnant solution on a support to form a composition wherein substantially all of the active metal impregnated on the support is found as metal particles in a pre-specified metal particle size range below about 200 A is disclosed.

14 Claims, No Drawings

METHOD OF MAKING A CATALYST COMPOSITION COMPRISING UNIFORM SIZE METAL COMPONENTS ON CARRIER

BACKGROUND OF THE INVENTION

This invention relates to a liquid impregnation medium comprising metal impregnates belonging to the Group VIII and platinum group metals. The microemulsion impregnant contemplated comprises metal-containing microemulsions which are suspended in a liquid medium. The liquid impregnant medium is useful to the deisgning and manufacturing of catalysts comprising a specified range of metal particle size.

The size of a metal particle on a support may be very important to developing a catalyst which meets the activity, stability and selectivity requirements of a particular catalytic process. For example, it has been noted that synthesis gas conversion may be improved by controlling the particle size of the active metal on a catalytic support. M. Boudart, *J. Phys. Chem.* v. 88, (11), 1984. A means for controlling the size of metal particles to be impregnated is through the employment of microemulsions. The term "microemulsions" has been used to describe a variety of multi-component systems. In the instant invention a microemulsion is defined as a thermodynamically stable solution of water, hydrocarbon and surfactant which has the property of transmitting light equally in all directions. The microemulstions contemplated by the present invention are systems in which the hydrocarbon forms a solvent containing water in a reverse micelle, i.e., water pools surrounded by surfactant molecules. Each reverse micelle contains one water pool which may be thought of as an aqueous nuclei or water core. The water cores are isolated from one another by the nonaqueous environment.

The prior art discloses that metal salts may be dissolved into the individual water pools of the microemulsion. For example, in U.S. Pat. No. 4,425,261 reverse micelle microemulsions comprising hexane, pentha-ethylene glycol dodecylether (PEGDE), water, and respectively platinum, palladium, and rhodium salts were prepared. The metal compounds employed were dissolved and encapsulated in the water core of the reverse micelle. In order to obtain an impregnant of uniform metal particles, the micelle solution was first neutralized with an alkali base such as sodium hydroxide and the metal in the water core of the micelle was subsequently reduced with a reducing agent such as hydrogen and/or hydrazine. The metal particles formed in this way were uniform in size and did not deviate more than +/−10% in diameter. Only after the metal particles were reduced and metal flakes were formed within the water core could the metals be deposited on an oxide support. In other words, the impregnant disclosed by patentee necessarily requires the active impregnate metal to be present in a reduced valence state prior to contact with any oxide support.

The above described liquid suspension is believed to be the closest prior art disclosing reverse micelle containing impregnant solutions. Although patentee's liquid suspension is functional, it is not readily adaptable to commercial catalyst manufacture. First, the preparation of patentee's liquid suspension requires multiple steps leading to high economic inefficiency. For example, the reuse of starting materials and reagents, a common manufacturing technique, may be inhibited. Also, the impregnation of reduced metal particles on an oxide support does not generally result in an acceptable catalyst because the requisite thermal stability cannot be achieved. The transfer of colloidal metallic particles onto a support surface lacks sufficient metal-support chemical interaction, a feature which is generally accepted as a requisite for good catalytic action. Desirable metal-support interaction is gained usually when the metallic state is achieved in the presence of the support during catalyst finishing. In addition, the colloidal metallic particles in the patentee's description may also agglomerate during impregnation or transfer onto the surface of a support, leading to broad metallic size distribution.

The impregnant medium contemplated in the present invention avoids these problems by maintaining the metal impregnate ions contained in the water core of the reverse micelle in a nonreduced state. By the term "nonreduced state" it is meant that the metal is not present in the impregnant solution in a zero valence state, but rather is present as a dissolved metal ion. In accordance with the process for catalyst manufacture employing the reverse micelle containing liquid impregnant medium of the present invention and in contradistinction to the prior art, the metal ions contained in the water cores of the impregnant solution are reduced directly on the support surface after impregnation of the micelle.

The object of this invention is therefore to produce an impregnant medium comprising impregnatable metal containing reverse micelles. Further, it is an object of the present invention to prepare a liquid impregnant medium comprising reverse micelles which will yield uniform metal crystallites on an oxide support when contacted therewith. It is also an object of the present invention to reduce the number of steps required to form a stable liquid suspension or impregnant medium comprising reverse micelles. Finally, it is also an object of the present invention to provide a simple method of preparing the reverse micelle solution employed as an impregnant medium as well as a method for impregnated uniform metal crystallites on a catalyst support material. Further objectives, including the manufacturing of catalyst compositions having specific metal particle sizes and their use in various conversion processes as well as modifications which are obvious to those skilled in the pertinent art, are also contemplated.

SUMMARY OF THE INVENTION

The above objectives are accomplished in the instant invention first by providing a high metal concentration in the water core of the reverse micelle. The amount of metal contained in the water core is to be sufficient to impart a catalytic effect in a conversion process when impregnated on a support material. Reverse micelle containing impregnant solutions having high metal concentrations in the reverse micelle water core have not been disclosed by the prior art. In addition, the use of a broader range of surfactants in the preparation of a reverse micelle containing impregnant medium have also not been disclosed by the prior art.

In accordance with the present invention, there is provided a liquid impregnant solution comprising metal containing microemulsions suspended in a liquid medium wherein said microemulsions comprise a water core having a metals concentration greater than 0.1 mole per liter.

In accordance with the present invention there is also provided a method of manufacture of a metal containing microemulsion impregnant solution comprising dissolving a metal compound in a sufficiently minimum amount of water to form a metal water solution, admixing a nonpolar hydrocarbon and at least one surfactant having polar and nonpolar characteristics to form a hydrocarbon/surfactant solution and adding said water solution to said hydrocarbon/surfactant solution under mixing conditions to form a liquid impregnant solution comprising metal containing reverse micelle microemulsions.

Further embodiments will be apparent from the following discussion. In addition, those embodiments within the purview of one skilled in the appropriate art are also contemplated and do not remove the instant composition beyond the scope and spirit of the appended claims.

DETAILED DESCRIPTION OF THE INVENTION

Microemulsions are thermodynamically stable and optically isotropic solutions of water, hydrocarbons and at least one surfactant. The microemulsion system contemplated by the present invention is a system known as a reverse micelle. In the reverse micelle a water core or nuclei is surrounded by the polar head groups of the surfactant. The nonpolar portion of the surfactant extends into the nonpolar hydrocarbon solvent solution thus forming the reverse micelle. When metals are dissolved in the water used in the preparation of the reverse micelle, the metals become encapsulated in the water core. The individual water cores which make up the reverse micelle solution are isolated from one another by the nonaqueous environment. Important factors which contribute to the size of a metal particle which is ultimately deposited on a support material from the reverse micelle containing impregnant solution are the amount of water present in each individual microemulsion and the metal concentration in the water. Even though the precise structure of reverse micelles is still not known, the size and shape of these microemulsions are dependent on the surfactant, solvent, the amount of water and metals dissolved therein.

Without being limited to theory, it is postulated that the size of the water core of a reverse micelle plays a role in producing a suitable impregnant medium. Very small amounts of water are preferred in the present invention. Even though amounts as high as 5 wt. % may be employed, it is preferred by the present invention that the water be present in amounts less than 4.0 wt. %, more preferably less than 2.0 wt. %, and most preferably less than 1.0 wt. %. The amount of water present affects the size of the water core as measured by the volume average water core diameter. Preferably the size of the water core is in the range of about 10 to 200 A and more preferably in the smaller size range of about 20 to 90 A.

The surfactant employed in the present invention will possess both polar and nonpolar characteristics. The polar head groups of the surfactant occupy the interior of the reverse micelle while the hydrophobic hydrocarbon part of the surfactant extends into the nonpolar solvent. In a reverse micelle, the polar phase may or may not contain water. In the present invention, however, the polar phase contains water in the core of the reverse micelle and may be generally referred to as a water in oil (w/o) dispersion. The surfactant may be a nonionic, ionic or cationic compound. Polyethylene glycol ethers are preferred nonionic surfactant compounds. Even though the number of carbon atoms in the carbon chain are not particularly critical, nonionic surfactants comprising about 10 to 16 carbon atoms in the carbon chain are preferred. Thus, for example, a particularly preferable surfactant is polyethylene glycol dodecyl ether. Suitable anionic surfactant compounds include sodium dodecyl sulfate. Suitable cationic surfactant compounds include cetyl trimethyl ammonium halides. A particularly preferred cationic surfactant is cetyl trimethylammonium bromide. Suitable co-surfactants include medium chain length alcohols such as n-octanol. Other suitable surfactants include butanol.

The surfactant may be present in the impregnant solution in a concentration range of 5 to 40 wt. %. The surfactant should also be present in a weight ratio range of surfactant to water of about 0.2:1 to 40:1. Co-surfactants, i.e., combinations of one or more nonionic, anionic, and/or cationic compounds are also contemplated by the present invention. Thus, reverse micelle impregnant solutions comprising co-surfactants such as n-butanol and penthaethylene glycol dodecyl ether are contemplated by the present invention.

The hydrocarbon solvent employed in the present invention should not have any chemical reactivity with other components of the solution. The hydrocarbon should also have a substantially nonpolar characteristic so that the nonpolar portion of the surfactant is readily soluble therein while water, which forms the water core of the formed reverse micelle is substantially insoluble in the hydrocarbon. Hydrocarbons which are useful as solvents for the instant impregnant solution comprise aliphatic noncyclic hydrocarbons such as hexane, heptane, octane, etc., and their branched isomers. Also, aliphatic cyclic hydrocarbons are contemplated by the present invention. Since the reverse micelles of the impregnant solution are ultimately impregnated on a carrier, it is preferred that the hydrocarbon solvent is readily volatile under finishing conditions. Thus, hydrocarbon solvents in the 6 to 10 carbon atom range will possess the generally preferred volatility characteristics.

The selection of a metal compound is critical to the instant impregnant solution. In order to be effective as an impregnant medium, a high metal concentration in the water core is necessary. If the metals content is too low, the resulting aggregate amount of metal deposited on a support carrier by way of the impregnant medium will be too small to effect any substantial catalytic activity in a conversion process. In addition, since the concentration of water in the impregnant solution is very low and therefore the size of the water core is very small a high metal solubility is contemplated. Moreover, a small water core diameter enhances the control of the size of metal particles deposited on a carrier. Thus, in order to obtain a sufficient catalytic amount of metal on a particular carrier, a high concentration of the metal compound in the water core is necessary. Metal ion concentrations in the water core of the reverse micelles is preferably greater than 0.1 mole per liter. More preferably, when a catalytic amount of at least 1 wt. % metal is required to be deposited on a carrier, the metal ion concentration in the water core should be at least 0.5 mole per liter. Most preferably, the metal ion concentration in the water core is in the range of about 0.5 to 1.5 moles per liter. Metal compounds which are suitable for the present invention include the metal salts and acids. Thus, chloro metal acids as well as the metal chlorides are contemplated. In the case of platinum, chloroplatinic acid or its sodium salt are contemplated. Likewise, similar compounds for other Group VIII and platinum metals, such as palladium, rhodium, iron and cobalt are contemplated.

It is also contemplated by the present invention that the aqueous solution may be modified by any manner known to those skilled in the art to increase the metal solubility. Thus, increasing metal solubility through lowering the pH of the aqueous solution by adding concentrated hydrochloric acid, aqua regia (HCl/HNO$_3$), etc., to allow a greater amount of metals to be dissolved therein is contemplated by the present invention. For example, if the compound chloroplatinic acid were the metal precursor, and a high platinum metal content were desired, concentrated hydrochloric acid may be added to water in an amount sufficient to achieve the desired platinum concentration. Thus, although a metal compound with high solubility is preferred, solvent modification such as that described above (or similar techniques increasing metal solubility) are contemplated by the present invention in order that a high metals concentration in the water core is achieved.

Even though at the present time the Group VIII metals such as ruthenium, platinum, palladium, rhodium are preferred, other metals are contemplated by the present invention. Thus, metals of Group IA, IIA, IIIB, IVB, VB, VIB, VIIB, IB, IIB, IIIA, IVA, VA and those of the Lanthanum series, as well as any combination thereof, are also contemplated. Specifically contemplated metals include potassium, magnesium, titanium, zirconium, chromium, molybdenum, tungsten, silver, gallium, indium, germanium, tin, antimony, cerium, and any combination thereof.

Two mutually insoluble phases such as water and oil can be made to disperse within each other by means of a surfactant which lowers the interfacial tension between them. An oil in water, o/w (normal), or a water in oil, w/o (reverse), micelle system is formed, depending upon whether the surfactant-water or the surfactant-oil interfacial energy is lowered to a greater extent. The overall micelle formation process is also favorable because the entropy change for dispersing the oil and water phases is positive.

Kinetics of micellization is fast, i.e., the time constant of the slowest step usually being in the order of milliseconds. Thus, a narrow micelle size distribution around a thermodynamically determined value is quickly achieved upon mixing of the oil/surfactant/water mixture.

Although the relative contribution of factors affecting micelle formation and the final equilibrium state of the micelle system is not well understood, micelle size can be controlled with the choice of the proper parameters. A co-surfactant, such as a medium chain length alcohol, can be added to the oil+water+surfactant mixture to lower the interfacial tension between these phases to an even greater extent and therefore allow a further decrease in micelle size. Suitable cosurfactants contemplated would comprise aliphatic straight chain alcohols. Preferably, the alcohols comprise from about 3 to 6 carbons. Thus, propanol, butanol, pentanol and hexanol are preferable cosurfactants. However, the co-surfactant, which is usually more hydrophobic than the surfactant, can position itself between the surfactant molecules and cause an increase in the average distance between the polar head groups. This would decrease the electrostatic repulsive forces, and possibly cause micelle growth by agglomeration. An electrolyte like NaCl has a similar effect by supplying counterions to the polar head groups of the surfactant. The equilibrium size of an o/w (normal) micelle will, for instance, incrase with the extent of the oil phase. Water has a similar effect on the size of w/o reverse micelles. Temperature, particularly for nonionic surfactants, can also be used to vary the micelle size.

The reverse micelle impregnant solution may be prepared by first dissolving the metal compounds in water to form a metal ion solution. The water metal ion solution is subsequently admixed with a previously prepared admixture of surfactant and hydrocarbon solvent. The two solutions are admixed to form the impregnant medium which is a clear solution containing the reverse micelle.

The impregnant medium of the present invention is used to impregnate the metals dissolved in the water core of the reverse micelle onto a particular support carrier. Carrier materials include any refractory inorganic oxide which are either amorphous or crystalline. For examples, carriers such as alumina, silica, silica alumina, titania, magnesia, and other known metal oxide supports are contemplated.

Catalyst compositions may be manufactured by an impregnation technique known in the art. Well known methods such as dip and vacuum impregnation are contemplated. In addition, impregnation may be carried out in a single contacting step or multiple steps with reverse micelle containing solutions which contain identical or different metals.

A preferred impregnation procedure comprises contacting a support material (preferably 40–200 mesh) with the impregnant solution and agitating the admixture and separating the support material from the impregnant solution. In the cases where platinum and/or palladium metal ions were dissolved in the reverse micelle water core, the impregnant solution turned colorless while the support material took on a light yellow shade. After air drying, some of the organic compounds which have remained on the impregnated support may be removed by a helium purge at about 50°–300° C. Residual organics and carbonaceous deposits on the impregnated support may also be removed by air oxidation at about 200°–600° C. The particular order of the helium purge and air oxidation steps is not believed to be critical when both steps are employed. The metal containing micelles impregnated on the support, are then subjected to a reduction atmosphere while on the support surface by contact with flowing hydrogen at about 200°–600° C. The metal compounds on the support are reduced while on the support surface by contact with flowing hydrogen.

Catalyst compositions prepared according to the impregnation technique employing a reverse micelle impregnant solution possess a uniform size range of metal particles. The upper and lower limits of metal particle sizes may differ by 10 to 20 A. Preferably the metal particle size range limits will differ by as little as 5 A. Minimum particle sizes contemplated are about 5 A. The maximum particle size may be as great as 200 A. Catalyst compositions comprising impregnated metal particle ranges of 5–10 A, 20–30 A, 20–40A, 30–40 A, 40–60 A, 60–80 A, 80–100 A, 100–120 A, 120–140 A, etc., are contemplated.

A unique characterixtic of the catalysts prepared by the present technique is that substantially all of the active metal impregnated on the support is found as metal particles in a pre-specified metal particle size range. By the term "substantially," it is meant that at least 90 wt. % of the impregnated metal as detected by state of the art analytic methods is impregnated on the support as clusters of metal particles within the pre-specified range. Preferably, 95 wt. % of the impregnated metal will be present as clusters of metal particles within the prespecified metal particle size range.

The catalyst compositions of the present invention also comprise amounts of active metals sufficient to impart a catalytic effect when impregnated on a support. Weight percentages between 0.1 wt. % and 20 wt. % of the total catalyst composition are contemplated. The uniqueness of the instant catalyst compositions is attributed to the ability to dissolve large amounts of metal ions into the small water core of the reverse micelle contained in the impregnant medium. Thus, the unique properties of the present catalyst compositions are, in part, accredited to the high solubility of the particular metal compound chosen for preparation of the reverse micelle impregnant solution. In addition, without being limited to theory, it is believed that the minimization of the water core size discourages agglomeration of the metal particle during impregnation.

In any event, the present invention allows for the design and construction of catalyst compositions having predetermined and pre-specified metal particle size ranges impregnated thereon. The instant novel catalysts are advantageous over prior art colloidal metal containing catalysts in that the stability as against metal particle agglomeration is much greater. It is believed that the higher stability of the instant catalyst results from the particular chemical interaction between the impregnated metal particles and the support. The exact bonding between the impregnated metal and oxide support is not known, but is is postulated that a highly integrated bonding network which is formed by way of air oxidation and then reduction of the metal ion while impregnated on the support contribute to this unique agglomeration stability.

The present invention is useful in the preparation of reverse micelle impregnant solutions which may be employed in the preparation of the novel catalytic materials described above. The novel catalytic materials are useful in any known catalytic conversion process, especially those catalytic processes which are known to have product yield distributions which are dependent upon the particle size of the catalytically active metals.

It is contemplated that the instant reverse micelle impregnant solution may be employed as an impregnant medium in a known impregnation technique in the art. Commercially successive techniques such as dip and vacuum methods of metals impregnation are also particularly suitable to the present invention.

The examples below are merely exemplary of the present invention and are not intended to limit the scope of the appended claims. Modifications, additions, and alterations to the impregnant medium exemplified below which are obvious to those skilled in the pertinent art area are also contemplated herein and are not outside the spirit of the present invention.

EXAMPLE I

The following is an example of a reverse micelle impregnant solution containing platinum metal ions in the water core. 0.7 grams of PEGDE was dissolved in 10 cc of normal hexane solvent. To this solution 0.05 cc of a water platinum solvent solution was added. The water platinum solvent solution was made from a pure platinum metal sponge dissolved in a nitric acid/concentrated HCl solution. The concentration of platinum in the water/platinum salt solution was 200 mg platinum/cc. The presence of the reverse micelle was confirmed by analysis with an HB-5 VG microscope. The water core diameter of the reverse micelle was measured by SAXS to be about 110 A.

EXAMPLE II

This example illustrates the preparation of a reverse impregnant solution wherein two surfactants are employed. Berol 050 which is a commercial PEGDE product was distilled under vacuum between 115°-135° C. 0.7 grams of the PEGDE distilled surfactant and about 1.0 cc of n-butanol surfactant were added to 10 cc of n-hexane solvent. To this combination 0.05 cc of a platinum chloride solution of a Pt concentration of approximately 200 mg/cc solution was added. The platinum chloride solution was prepared from pure platinum sponge dissolved in a nitric acid/hydrochloric acid solution. The mixture was shaken resulting in a clear solution. The presence of reverse micelles of uniform size was confirmed by a scanning transmission electron microscope (STEM).

EXAMPLE III

The following example illustrates the preparation of a co-metal containing containing reverse micelle impregnant solution. The two metals employed were platinum and cobalt. A platinum containing solution of approximately 200 mg/cc was prepared by dissolving platinum sponge in a nitric acid/hydrochloric acid solution. A cobalt containing solution was prepared by dissolving reagent grade cobalt chloride ($CoCl_2$) in water sufficient to prepare a 200 mg/cc cobalt concentration. The reverse micelle impregnant solution was prepared by first mixing one drop (approximately 0.05 cc) of the platinum solution with one drop of the cobalt solution to form a co-metal aqueous solution. The co-metal aqueous solution was thoroughly mixed and added to a previously prepared combination of PEGDE surfactant dissolved in 10 cc of n-hexane solvent. Upon the admixture of the coaqueous solution and the surfactant/solvent combination turbidity was observed. Several drops of n-butanol co-surfactant were then added and the turbidity disappeared. The presence of reverse micelles of uniform size was confirmed by STEM analysis.

EXAMPLE IV

The following example illustrates the preparation of a platinum-iron co-metal reverse micelle impregnant solution. The synthesis of the reverse micelle was identical to that of Example III except that an iron containing solution was admixed with the platinum containing solution to form the co-metal aqueous solution. The iron containing solution was prepared by dissolving the appropriate amount of reagent grade iron chloride ($FeCl_3$) in water to an iron concentration of about 200 mg/cc. The presence of reverse micelles of uniform size was confirmed by a STEM analysis. It should be noted that the addition of n-butanol as a co-surfactant was again necessary to remove the turbidity observed in the micelle solution. It is believed that turbidity problems may have been caused by the particular batch of PEGDE employed.

EXAMPLE V

The following example illustrates the preparation of a platinum-iron co-metal reverse micelle impregnant solution. The synthesis of the reverse micelle was identical to that of Example IV except that no butanol was added. The PEGDE was obtained from a different batch and did not exhibit the turbidity problems found in Example IV.

EXAMPLE VI

This is an example of manufacture of a platinum on gamma-alumina catalyst containing 40–60 A platinum crystallites. A solution described in Example I was mixed with 1 g of gamma-alumina which was 80–100 mesh at room temperature. The solution and alumina were shaken vigorously for a brief period of time. The solution turned colorless and the alumina slightly yellow. The n-hexane was decanted and the alumina powders purged with flowing air at 300° C. followed by a helium and finally hydrogen reduction at 500° C. The crystallite sizes were confirmed on the HB-5 STEM.

What is claimed is:

1. A method of producing a catalyst, which catalyst comprises about 0.1 to about 20 wt. % of an active metal component of an inorganic oxide support material, which comprises the sequential steps of:
   (a) contacting the support material with an impregnant solution containing water core microemulsions suspended in a liquid medium, with a metal component being present in the microemulsions as a dissolved metal ion in a nonreduced state at a concetration above 0.1 moles per liter;
   (b) separating the support material and the impregnant solution;
   (c) drying the impregnated support material, and then
   (d) reducing said metal component present on the support material, with the size distribution of the metal component deposited by steps (a)-(d) being such that at least 90 wt. % of said metal component is present as metal particles which do not vary more than 20 Å in size.

2. The method of claim 1 further characterized in that the liquid medium comprises about 5 to 40 wt. % of a surfactant having both polar and nonpolar characteristics and also comprises a substantially nonpolar hydrocarbon.

3. The method composition of claim 2 further characterized in that said metal component comprises Group VIII metals.

4. The method composition of claim 2 further characterized in that at least 90 wt. % of said metal particles do not vary more than 10 A in size.

5. The method composition of claim 2 further characterized in that said composition comprises a bimetallic metal component deposited thereon.

6. The method composition of claim 1 further characterized in that said metal component comprises platinum group metals.

7. The method composition of claim 6 further characterized in that said support material comprises alumina, silica, silica-alumina or combinations thereof 8. The method of claim 1 further characterized in that at least 90 wt. % of the metal component is present on the finished catalyst as metal particles which do not vary more than 10 A in size.

9. The method of claim 8 further characterized in that the metal particles have a minimum size of about 5 Angstroms.

10. A method of preparing a catalyst comprising about 0.1 to about 20 wt. % of a Group VIII metal on an inorganic oxide support material, which method comprises the steps of:
    (a) contacting the support material with a reverse micelle solution comprising water cores containing at least one dissolved Group VIII metal ion present in a nonreduced state at a concentration above 0.1 moles per liter and impregnating the support material with said Group VIII metal component;
    (b) drying the thus impregnated support material and removing residual organics and carbonaceous deposits from the impregnated support material by air oxidation at about 200–600 degrees C.; and
    (c) reducing said metal component present on the support by contact with hydrogen at 200–600 degrees C.

11. The method of claim 10 further characterized in that the pH of the water core is lowered by addition of an acid to increase metal solubility in the aqueous solution.

12. The method of claim 10 further characterized in that the reverse micelle solution contains less than 4 wt. % water, about 5 to 40 wt. % of a surfactant which possesses both polar and nonpolar characteristics and comprises about 10 to 16 carbon atoms per molecule, and the solution also contains a hydrocarbon solvent having 6 to 10 carbon atoms per molecule.

13. The method of claim 10 further characterized in that the water core of the reverse micelle contains a metal ion in a nonreduced state at a concentration of at least 0.5 mole per liter.

14. The method of claim 13 further characterized in that the support material comprises alumina, silica or silica-alumina.

* * * * *